US011046489B2

(12) United States Patent
Hayakawa et al.

(10) Patent No.: US 11,046,489 B2
(45) Date of Patent: Jun. 29, 2021

(54) FOOD CONTAINER AND METHOD FOR MANUFACTURING SAME

(71) Applicant: IWASAKI INDUSTRY INC., Yamato-koriyama (JP)

(72) Inventors: Yuuki Hayakawa, Tokai (JP); Noriaki Date, Tokai (JP); Yoshihisa Iwasaki, Yamato-koriyama (JP)

(73) Assignee: IWASAKI INDUSTRY INC., Yamato-koriyama (JP)

( * ) Notice: Subject to any disclaimer, the term of this patent is extended or adjusted under 35 U.S.C. 154(b) by 367 days.

(21) Appl. No.: 15/573,002

(22) PCT Filed: Dec. 21, 2016

(86) PCT No.: PCT/JP2016/088151
§ 371 (c)(1),
(2) Date: Nov. 9, 2017

(87) PCT Pub. No.: WO2017/110897
PCT Pub. Date: Jun. 29, 2017

(65) Prior Publication Data
US 2018/0118431 A1    May 3, 2018

(30) Foreign Application Priority Data
Dec. 25, 2015 (JP) .............................. JP2015-255018

(51) Int. Cl.
*B65D 43/02* (2006.01)
*B65D 53/02* (2006.01)
(Continued)

(52) U.S. Cl.
CPC ............. *B65D 53/06* (2013.01); *A47G 19/12* (2013.01); *B65D 11/10* (2013.01);
(Continued)

(58) Field of Classification Search
CPC .... B65D 53/02; B65D 53/06; B65D 2543/00; B65D 2543/0009; B65D 2543/00018;
(Continued)

(56) References Cited

U.S. PATENT DOCUMENTS 5,060,818 A * 10/1991 Doi ..................... B65D 41/0442
220/62.12
2004/0099987 A1 * 5/2004 Imai ..................... C08L 2666/06
264/177.1
(Continued)

FOREIGN PATENT DOCUMENTS

JP        62-76155 U      5/1987
JP        9-295655 A     11/1997
(Continued)

OTHER PUBLICATIONS

Tuftec product data sheet published online by Asahi Kasei Chemicals at http://www.chemwinfo.com /private_folder/Uploadfiles 2015_July/Asahi_Kasie_SEBS_Brochure.pdf on Apr. 2015 (Year: 2015).*
(Continued)

*Primary Examiner* — Lee S Sanderson
(74) *Attorney, Agent, or Firm* — Oblon, McClelland, Maier & Neustadt, L.L.P.

(57) ABSTRACT

Provided are a food container which is formed to have a sealing moiety integrated with a lid or a container body and is not easily deformed when heated by a microwave oven or the like, so as to be capable of keeping a sealed state, and a method for manufacturing the food container. A food container 10 has a container body 11 having, in the upper surface thereof, an opening 111, and a lid 12 fittable to the container body 11 to close the opening 111. In the lid 12 or the container body 11, a sealing moiety 13 is located which makes the periphery of the opening 111 in a sealed state under a situation that the opening 111 is closed by the lid 12. The sealing moiety 13 includes an elastomer composition
(Continued)

which includes a hydrogenated styrene based block copolymer A that has a weight-average molecular weight of 100,000 to 500,000, a softener B for rubber that has a weight-average molecular weight of 500 or more, and an olefin based resin C, and which has a hardness A of 5 to 70 both inclusive, and a compressive permanent strain (CS) of 60% or less at 100° C. over 24 hours. The sealing moiety is formed to be integrated with the lid or the container body, and the lid 12 or the container body 11 includes a polypropylene.

4 Claims, 3 Drawing Sheets

(51) Int. Cl.
| | | |
|---|---|---|
| *B65D 53/06* | (2006.01) | |
| *B65D 81/34* | (2006.01) | |
| *A47G 19/12* | (2006.01) | |
| *B65D 45/18* | (2006.01) | |
| *B65D 6/00* | (2006.01) | |
| B29C 45/16 | (2006.01) | |
| B29K 9/06 | (2006.01) | |
| B29K 23/00 | (2006.01) | |
| B29L 31/26 | (2006.01) | |
| B29L 31/00 | (2006.01) | |

(52) U.S. Cl.
CPC ......... *B65D 43/0212* (2013.01); *B65D 45/18* (2013.01); *B65D 53/02* (2013.01); *B29C 45/1676* (2013.01); *B29K 2009/06* (2013.01); *B29K 2023/12* (2013.01); *B29K 2995/007* (2013.01); *B29K 2995/0021* (2013.01); *B29L 2031/26* (2013.01); *B29L 2031/712* (2013.01); *B65D 81/3453* (2013.01); *B65D 2543/00185* (2013.01); *B65D 2543/00222* (2013.01); *B65D 2543/00296* (2013.01); *B65D 2543/00462* (2013.01); *B65D 2543/00472* (2013.01); *B65D 2543/00537* (2013.01); *B65D 2543/00564* (2013.01); *B65D 2543/00574* (2013.01); *B65D 2543/00583* (2013.01); *B65D 2543/00648* (2013.01); *B65D 2543/00694* (2013.01); *B65D 2543/00805* (2013.01); *B65D 2543/00972* (2013.01)

(58) Field of Classification Search
CPC ........... B65D 2543/00064; B65D 2543/00074; B65D 2543/00092; B65D 43/02; B65D 43/0202; B65D 43/0214; B65D 43/022; B65D 51/16; B65D 51/1672; B65D 51/1683; B65D 2543/00009; B65D 2543/00296; B65D 53/00; B65D 53/04; B65D 45/20; B65D 2543/00564; B29C 45/02; B29C 45/16; B29C 45/18; B29C 45/1676
USPC ............ 428/34.4, 35.7; 220/310.1, 378, 614, 220/790, 795; 525/95
See application file for complete search history.

(56) References Cited

U.S. PATENT DOCUMENTS

| | | | |
|---|---|---|---|
| 2005/0214486 A1* | 9/2005 | Ochiai | ................. B41M 5/41 428/32.63 |
| 2009/0026205 A1 | 1/2009 | Moon | |
| 2010/0237070 A1* | 9/2010 | Coonce | ............. B65D 81/2038 220/203.29 |
| 2011/0056906 A1* | 3/2011 | Meadows | .......... B65D 47/0838 215/316 |
| 2017/0217069 A1* | 8/2017 | Hirokawa | ............... B29C 48/16 |

FOREIGN PATENT DOCUMENTS

| | | | | |
|---|---|---|---|---|
| JP | 10-120043 A | | 5/1998 | |
| JP | 11-263358 A | | 9/1999 | |
| JP | 2000-281117 A | | 10/2000 | |
| JP | 2000281117 A | * | 10/2000 | ............. B65D 53/04 |
| JP | 2003147156 A | * | 5/2003 | |
| JP | 2004307564 A | * | 11/2004 | |
| JP | 2009-29512 A | | 2/2009 | |
| JP | 2010/150499 A | | 7/2010 | |

OTHER PUBLICATIONS

Maier, Clive, and Teresa Calafut. "Polypropylene: the Definitive User's Guide and Databook", Plastics Design Library, 1998 (Year: 1998).*
Japanese Office Action dated Apr. 16, 2019, in Patent Application No. 2017-558199, 10 pages (with unedited computer generated English translation).
International Search Report dated Feb. 28, 2017 in PCT/JP2016/088151 filed Dec. 21, 2016.
Extended European Search Report dated Aug. 13, 2019 in Patent Application No. 16878784.4.
Japanese Office Action dated Aug. 6, 2019, in Patent Application No. 2017-558199, 10 pages (with unedited computer generated English translation).
Combined Chinese Office Action and Search Report dated Apr. 26, 2019, in Patent Application No. 201680029843.1, 10 pages (with English translation).

* cited by examiner

FOOD CONTAINER AND METHOD FOR MANUFACTURING SAME

TECHNICAL FIELD

The present invention relates to a food container which is not deformed even when heated by a microwave oven or the like, and a method for manufacturing the food container.

BACKGROUND ART

Hitherto, storage containers, lunch boxes, and other various food containers have been suggested the inside of which can be sealed. In general, the food containers each have a structure which has a container body having an opening, and a lid for closing the opening and which has, between the container body and the lid, a sealing moiety made of an elastic material for sealing the periphery of the opening in order to store food inside the container body in a sealed state.

For example, a container described in Patent Literature 1 for microwave ovens has a container body and a lid, and a packing (sealing moiety) arranged between an opening end of the container body, and the lid. Furthermore, Patent Literature 1 discloses that in a microwave oven, the use of the container is made possible by using, for the container body, the lid and the packing (sealing moiety), a material which is not inductively heated.

About a container lid described in Patent Literature 2, a packing (sealing moiety) including wing portions is formed to be integrated with the lid. Furthermore, Patent Literature 2 discloses that a plastic matter called a coma, which is excellent in elasticity and adhesive property, is used for the packing (sealing moiety), the coma being formed to be integrated with the packing (sealing moiety) by, for example, insert molding.

A packing material described in Patent Literature 3, or a thermoplastic elastomer composition described therein for the packing material is a material or composition obtained by giving excellent sealing performance, heat resistance, shapability and sliding property to an olefin block copolymer by blending a predetermined amount of polyethylene into this block copolymer. Furthermore, Patent Literature 3 discloses that the thermoplastic elastomer composition for the packing material can endure retorting treatment for sterilization (at 120° C. for 30 minutes).

CITATIONS LIST

Patent Literatures

Patent Literature 1: JP H10-120043 A
Patent Literature 2: JP 2009-29512 A
Patent Literature 3: JP 2010-150499 A

SUMMARY OF INVENTION

Technical Problems

As a new topic, out of conventional food containers as described above, for example, a container made usable in a microwave oven, such as the container in Patent Literature 1 for microwave ovens, is useful since no labor is necessary for transferring a food product held in the container to, for example, another container when the food product is warmed by the microwave oven.

However, in the container for microwave ovens in Patent Literature 1, the sealing moiety is not formed to be integrated with the lid or the container body, so that water or dirt enters a gap between the sealing moiety, and the lid or container body. The gap easily becomes a hot bed for molds or bacteria. It is therefore necessary to take off the sealing moiety from the lid or container body, and clean the moiety. Accordingly, about any food container from which its sealing moiety can be taken off as disclosed in Patent Literature 1, for example, the following problems are caused: it is a troublesome operation to put/take off the sealing moiety onto/from the lid or container body; the taken-off sealing moiety may be unfavorably lost; and because of an error of the putting-on/taking-off operation, the sealing moiety may be unfavorably deformed to make the sealed state unsatisfactory.

About a food container from which its sealing moiety can be taken off as described above, as the raw material of the sealing moiety, a soft silicone resin is generally used in many cases. However, the soft silicone resin is a material unsuitable for being formed to be integrated with a different material used in general frequently as a raw material of a lid or a container body such as thermoplastic resin. Thus, any sealing moiety made of the soft silicone resin has a problem that the moiety is not easily integrated with a lid or a container body.

In the meantime, the container lid in Patent Literature 2 is formed to be integrated with the sealing moiety, so that a problem as in Patent Literature 1 is not caused. However, the literature does not specifically disclose the material called coma and used in the sealing moiety. Furthermore, the literature does not state that the container lid formed to be integrated with the sealing moiety is usable in heating by a microwave oven. Thus, this container lid has a problem that it is unclear whether or not the lid is usable in a microwave oven.

About the thermoplastic elastomer composition for packing material in Patent Literature 3, heat resistances thereof that are shown in working examples in the literature are each lower than 130° C. Thus, the composition has a problem that the composition cannot satisfy an indicated heat resisting temperature prescribed in JIS S 2029 "Plastic Tableware", the temperature being for tableware usable in microwave ovens and being 140° C. or higher.

In other words, out of the above-mentioned conventional food containers, the following food container is never suggested: a food container that is formed to have a sealing moiety integrated with a lid or a container body and is evidently usable in a microwave oven. Actually, in the case of using, in a microwave oven, existing food containers in each of which a sealing moiety is formed to be integrated with a lid or a container body by an insert formation method or the like, a portion of the lid or the container body, particularly, a site thereof that is joined to the sealing moiety is deformed to cause a problem that the sealed state of the container is not kept. Such problems have not been essentially solved.

Attention has been paid to the problems in the prior art, and then the present invention has been made, and an object thereof is to provide a food container which is formed to have a sealing moiety integrated with a lid or a container body and is not easily deformed when heated by a microwave oven or the like, so as to be capable of keeping a sealed state, and a method for manufacturing the food container.

Solutions to Problems

As a means for solving the above-mentioned problems, an aspect of an invention that is a food container has the subject matter of a food container comprising a container body having an opening, and a lid for closing the opening in the container body; the lid or the container body having a sealing moiety for making the periphery of the opening into a sealed state under a situation that the opening in the container body is closed by the lid; the sealing moiety comprising an elastomer composition which comprises a hydrogenated styrene based block copolymer A that has a weight-average molecular weight of 100,000 to 500,000, a softener B for rubber that has a weight-average molecular weight of 500 or more, and an olefin based resin C, and which has a hardness A of 5 to 70 both inclusive, and a compressive permanent strain (CS) of 60% or less at 100° C. over 24 hours; the sealing moiety being formed to be integrated with the lid or the container body; and the lid or the container body comprising a polypropylene.

An embodiment has the subject matter of the food container above, wherein the polypropylene is a polypropylene having a melting point of 155° C. or higher.

An embodiment has the subject matter of the food container, wherein in the elastomer composition, the blend amount of the softener B for rubber is from 50 to 300 parts by mass and that of the olefin based resin C is from 2 to 100 parts by mass for 100 parts by mass of the hydrogenated styrene based block copolymer A; the hydrogenated styrene based block copolymer A is a hydrogenated product of a block copolymer A' which comprises a polymer block (a) comprising a styrene based monomer and a polymer block (b) comprising a conjugated diene compound, the content by percentage of the styrene based monomer being from 10 to 40% by mass; and the softener B for rubber is a softener having a molecular weight distribution index (weight-average molecular weight (Mw)/number-average molecular weight (Mn)) of 4.0 or less.

An embodiment has the subject matter of the food container, wherein the sealing moiety, which is formed to be integrated with the lid or the container body, has a contacting portion which is to contact a predetermined site of the container body or the lid, and further the contacting portion is formed with a predetermined width to be made, as a whole, into a planar form.

An embodiment has the subject matter of the food container above, wherein about the lid and the container body, in the case of making a comparison between the width of a site of the lid or container body that is a site formed to be integrated with the sealing moiety, and the width of the above-mentioned predetermined site, with which the contacting portion is to be brought into contact, and then regarding smaller one of the two widths as 1, the predetermined width of the contacting portion is set into the range of 1 to 20.

An embodiment has the subject matter of the food container, wherein when the thickness of a moiety of the lid or the container body where the sealing moiety is formed is regarded as 1, the thickness of the sealing moiety is set into the range of 1 to 4.

Another aspect of the invention is a food container manufacturing method which is a method for manufacturing the food container of the present disclosure by performing a two color formation comprising: using a two color forming mold to inject a polypropylene into a cavity for forming the lid or the container body to form the lid or the container body into a predetermined shape; and subsequently injecting an elastomer composition into a cavity for the sealing moiety to form the sealing moiety to be integrated with the lid or the container body at a predetermined site of the lid or the container body which is a site becoming the periphery of the opening in the lid or the container body.

Advantageous Effects of Invention

Effects

The food container of the present invention has one characteristic of selecting, from various elastomer compositions, a composition having a hardness A of 5 to 70 both inclusive and a compressive permanent strain (CS) of 60% or less at 100° C. for 24 hours as a raw material of a sealing moiety of the container, and further forming the sealing moiety comprising the elastomer composition to be integrated with a lid or container body comprising a polypropylene.

In other words, in a food container as described above, for its lid or container body, many materials are usable, examples thereof including woody, metallic, glassy and plastic materials. Out of these materials, a plastic material, particularly, polypropylene is excellent in shapability, sanitation, lightness, economy, heat resistance and others to be adopted as a raw material for lids or container bodies in many food containers. Thus, in order to gain an elastomer composition that can be integrated with polypropylene, which is adopted as a raw material for lids or container bodies in many food containers, an elastomer composition combined with specified materials has been found out. This matter characterizes the present invention.

Thus, in the light of the matter that the elastomer composition of the present invention is used as a raw material of a sealing moiety, the elastomer composition has a first characteristic of having a hardness A of 5 to 70 both inclusive to retain an elasticity necessary for keeping the sealed state of the container that is based on the sealing moiety.

Furthermore, in the case of integrating different materials, such as the above-mentioned polymer polypropylene, and the above-mentioned elastomer composition, with each other, a difference in physical properties between the individual materials causes a problem that the integrated materials are deformed, peeled off from each other, cracked, or damaged into some other form by an external environment change, such as heating or cooling, wetting or drying, or tension deforming. Thus, about the elastomer composition in the invention, the compressive permanent strain (CS) thereof at 100° C. over 24 hours is set to 60% or less so that a compressive permanent strain is not easily generated in the composition. In other words, the invention has a second characteristic of improving the elastomer composition in compressive permanent strain resistance to realize a food container which does not suffer from a deformation problem when the container is heated by a microwave oven or the like.

The polymer polypropylene, which is used as a raw material of the lid or the container body formed to be integrated with the sealing moiety, is rendered a polypropylene having a melting point of 155° C. or higher. In this way, the food container can be made more difficult to deform when heated by a microwave oven or the like.

In the elastomer composition, in order to adjust the compressive permanent strain (CS) at 100° C. over 24 hours preferably to 60% or less, it is preferred about the blend ratio between its components to set the amount of the softener B for rubber and that of the olefin based resin C, respectively, into the range of 50 to 300 parts by mass and into that of 2 to 100 parts by mass for 100 parts by mass of the hydrogenated styrene based block copolymer A. Furthermore, the hydrogenated styrene based block copolymer A is rendered a copolymer that is a hydrogenated product of a block copolymer A' which comprises a polymer block (a) comprising a styrene based monomer and a polymer block (b) comprising a conjugated diene compound, the content by percentage of the styrene based monomer being from 10 to 40% by mass; and the softener B for rubber is rendered a softener having a molecular weight distribution index (Mz) (weight-average molecular weight (Mw)/number-average molecular weight (Mn)) of 4.0 or less, whereby the compressive permanent strain (CS) at 100° C. over 24 hours can be more appropriately set to 60% or less.

When any container is heated by a microwave oven or the like, a contacting portion of its sealing moiety with its container body or lid may be shifted out of position by a thermal shrinkage difference between the two in accordance with shapes or materials thereof. Thus, in the above-mentioned sealing moiety, which is integrated with the lid or the container body, a contacting portion is located which contacts a predetermined site of the container body or the lid, and this contacting portion is formed with a predetermined width to be made, as a whole, into a planar form. In this way, the sealed state of the food container can be favorably kept even when contacting positions of the two are shifted out of position by the thermal shrinkage difference.

About the lid and the container body, in the case of making a comparison between the width of a site of the lid or container body that is a site formed to be integrated with the sealing moiety, and the width of the predetermined site, which the contacting portion is to contact, and then regarding smaller one of the two widths as 1, the predetermined width of the contacting portion is set into the range of 1 to 20. This embodiment is preferred since the sealed state can be appropriately kept.

When the thickness of a site of the lid or the container body where the sealing moiety is formed is regarded as 1, the thickness of the sealing moiety is set into the range of 1 to 4, that is, the sealing moiety is made smaller in thickness. In this way, the food container can be satisfactorily restrained from being strained when heated by a microwave oven or the like.

In the present invention, the elastomer composition, which is a raw material of the sealing moiety, and the polypropylene, which is a raw material of the lid or container body formed to be integrated with the sealing moiety, are excellent in physical property balance in a high-temperature environment. Thus, the food container of the invention can easily be manufactured by a two color formation of forming the lid or the container body into a predetermined shape, and subsequently injecting the elastomer composition into a cavity of the used mold to form the sealing moiety into a predetermined shape at a predetermined site.

Advantageous Effects

The present invention makes it possible to yield a food container which is formed to have a sealing moiety integrated with a lid or a container body and is not easily deformed when heated by a microwave oven or the like, so as to be capable of keeping a sealed state; and to manufacture the food container easily.

DESCRIPTION OF EMBODIMENTS

Hereinafter, a description will be made in detail about embodiments in which the present invention is embodied.

Figure 1:
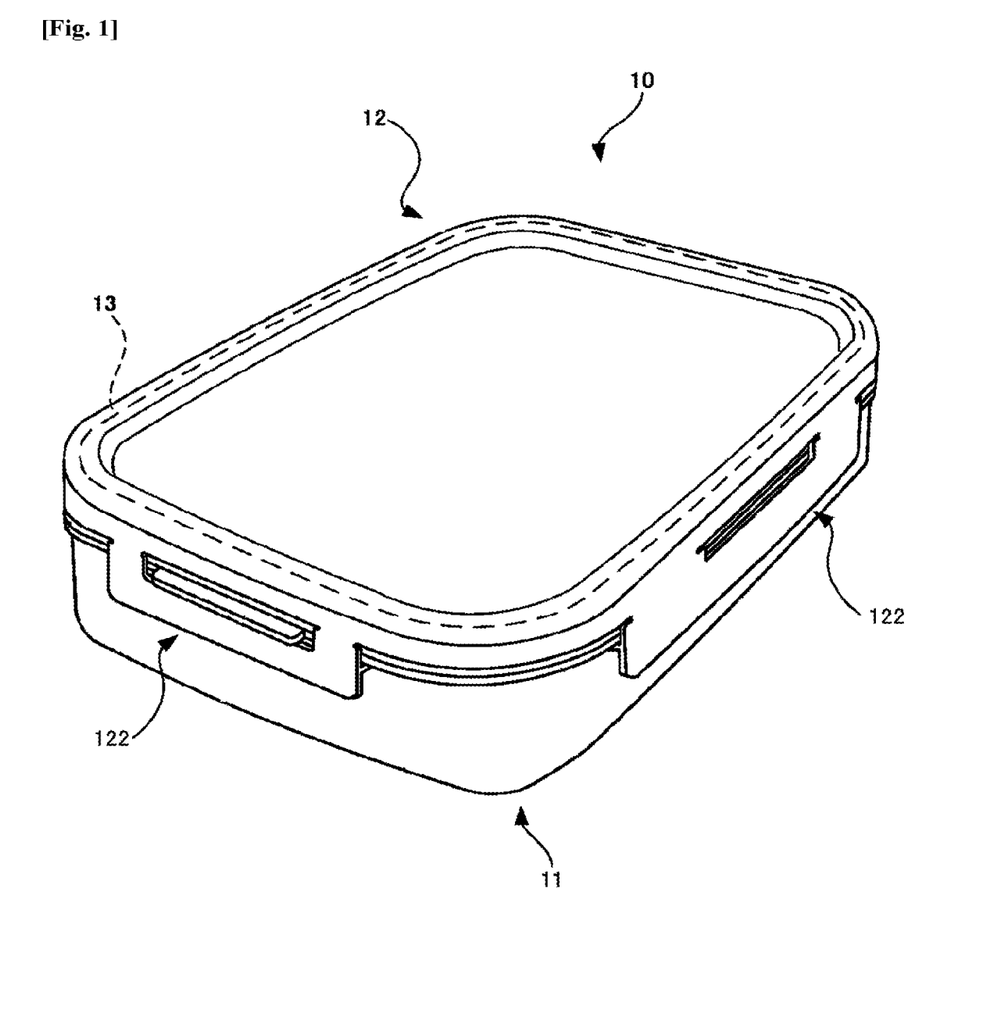
FIG. 1 is a perspective view illustrating a food container of an embodiment.

As illustrated in FIG. 1, a food container 10 has a container body 11 having, in the upper surface thereof an opening 111, and a lid 12 fittable to the container body 11 to close the opening 111. In the lid 12, a fixing portion 122 is located to each of four sides constituting the peripheral edge of the lid to fasten the lid 12 firmly to the container body 11. In the lid 12, the sealing moiety 13 is formed.

[Container Body]

Figure 2:
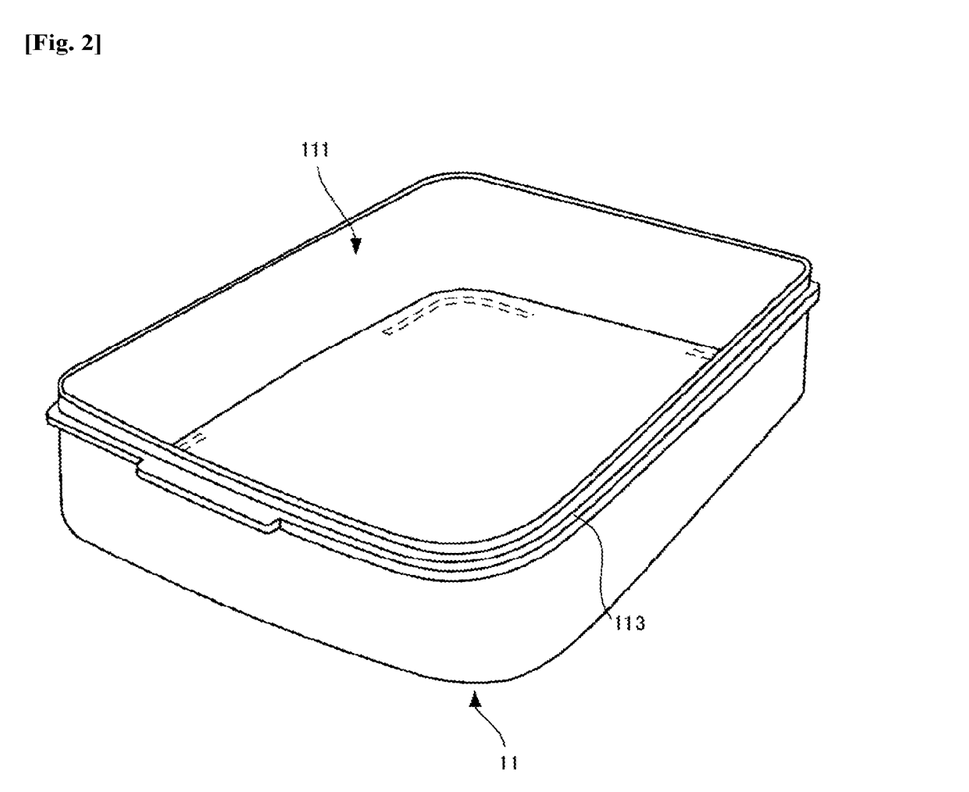
FIG. 2 is a perspective view of a container body in the embodiment.
Figure 3:
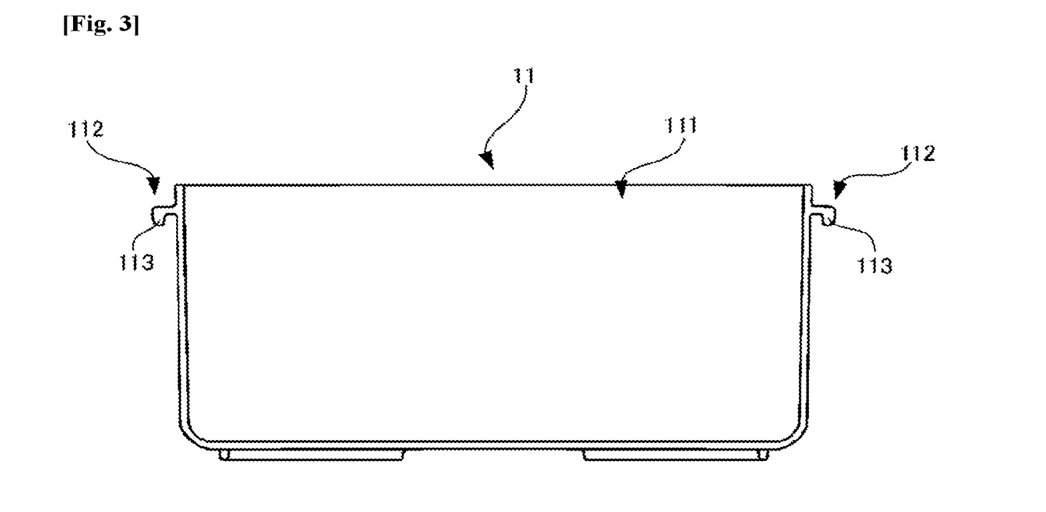
FIG. 3 is a sectional view of the container body in the embodiment.

As illustrated in FIGS. 2 and 3, the container body 11 is made into the form of a bottomed and rectangular parallelepiped the upper surface of which is opened. In the container body 11, the opening 111 is demarcated by a ringed periphery made of the upper end of the container body 11, and is in a substantially rectangular form when viewed in plan.

A flange 112 is formed, into a plate form, in the container body 11 on the outside surface of a peripheral wall of this body and at a position below the upper end of the wall, so as to be projected outwards in the horizontal direction. The flange 112 is continuously located over the entire periphery of the peripheral wall, and reinforces the peripheral wall of the container body 11.

A projection 113 is formed on the lower surface of the flange 112 and at the outer circumferential edge thereof, so as to be downward projected. In order to fix the lid 12 firmly to the container body 11, the projection 113 is a moiety to which hooks 124 that are made in the lid 12 and will be detailed later are hung.

[Lid]

Figure 4:
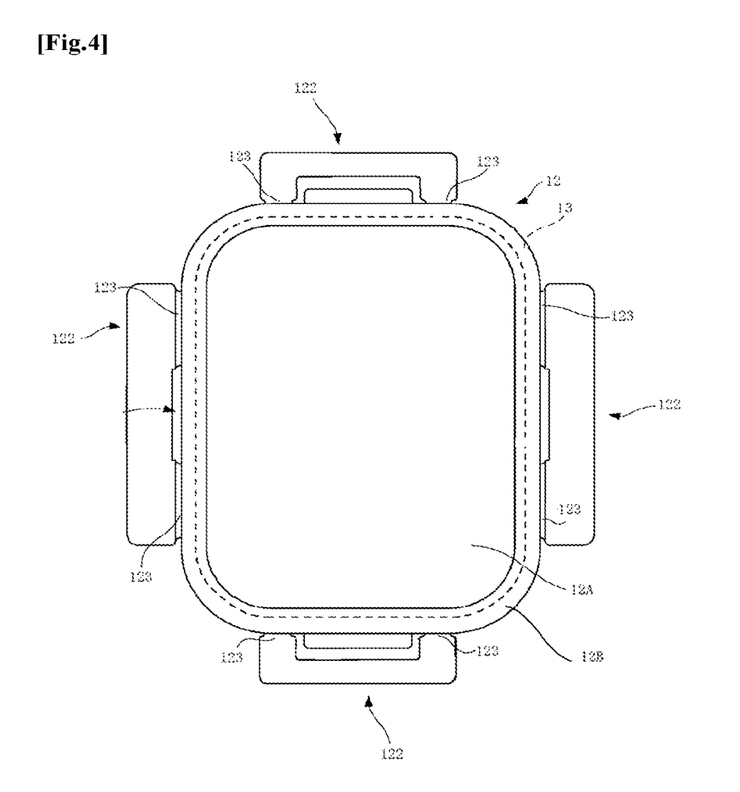
FIG. 4 is a plan view illustrating a lid in the embodiment.

As illustrated in FIG. 4, the lid 12 has a flat plate portion 12A in the form of a substantially rectangular plate when viewed in plan, and a peripheral portion 12B formed into the form of a continuous ring to surround the periphery of the flat plate portion 12A. The peripheral portion 12B is formed in such a manner that a sectional shape thereof is made in a reverse U-shaped form. Thus, in the lower surface thereof, a ringed groove 121 is made.

In the lid 12, a fixing portion 122 is located to each of four sides constituting the peripheral edge of the lid to fasten the lid 12 firmly to the container body 11. The fixing portion 122 is made in a plate form, and is configured to be connected through a hinge 123 to the peripheral edge of the lid 12, so as to be moved rotarily around the centrally positioned hinge 123 into upper and lower directions.

Figure 5:
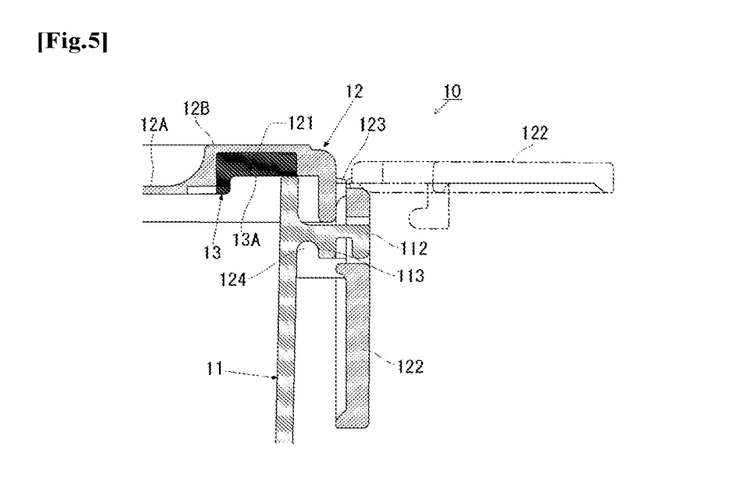
FIG. 5 is a sectional view illustrating a sealing moiety in the embodiment.

As illustrated in FIG. 5, the hooks 124 are each formed on the inner surface of corresponding one of the fixing portions 122 to have an L-shaped cross section. When the fixing portion 122 is rotarily moved downward, the hook 124 is configured to be hung to the projection 113 formed in the flange 112 of the container body 11 to be locked. In this way, the lid 12 can be firmly fixed to the container body 11.

[Sealing Moiety]

In the lid 12, the sealing moiety 13 is located inside the ringed groove 121. Using an elastomer composition having elasticity as a raw material, the sealing moiety 13 is formed to be integrated with the lid 12. Consequently, the food container keeps sanitation without having any gap which water or dirt enters between the sealing moiety 13 and the lid 12 (ringed groove 121).

As illustrated in FIG. 5, at the sealing moiety 13 formed to be integrated with the lid 12, a contacting portion 13A is disposed which is to contact the upper end surface of the peripheral wall of the container body 11. The contacting portion 13A is formed with a predetermined width to be made, as a whole, into a planar form.

When the lid 12 is fitted to the container body 11 to close the opening 111, the upper end surface of the peripheral wall of the container body 11 turns into the state of contacting the contacting portion 13A of the sealing moiety 13. When in this state the hooks 124 of the fixing portion 122 of the lid 12 are locked to the projection 113 of the flange 112 of the container body 11, the sealing moiety 13 made of the elastomer composition turns into the state of be pushed and pressed between the inner surface of the ringed groove 121 and the upper end surface of the peripheral wall of the container body 11. In this state, the sealing moiety 13 is pressed to contact the upper end surface of the peripheral wall of the container body 11 and adhere closely to this surface. In this way, the peripheral edge of the opening 111 is made into a sealed state.

By forming the sealing moiety 13 to make the contacting portion 13A into the planar form with the predetermined width, the following can be restrained: when the container is heated by a microwave oven or the like, the sealing moiety 13 and the container body 11 are shifted from each other by, for example, a thermal shrinkage difference therebetween, so as to cancel the sealed state of the food container. In other words, for causing the contacting portion 13A of the sealing moiety 13 to contact the contacting site surely in order to keep the sealed state appropriately when the container is heated, it is preferred about the predetermined width of the contacting portion 13A that the contacting portion 13A be made equal/larger in width to/than the contacting site.

Specifically, about the lid 12 and the container body 11, in the case of making a comparison between the width of a site of the lid 12 or the container body 11 that is a site formed to be integrated with the sealing moiety 13, and the width of the above-mentioned predetermined site, which the contacting portion 13A is to contact, and then regarding smaller one of the two widths as 1, it is preferred to set the predetermined width of the contacting portion 13A into the range of 1 to 20. In the present embodiment, the site with which the sealing moiety 13 is formed to be integrated is the ringed groove 121 of the peripheral portion 12B of the lid 12, and the predetermined site, which the contacting portions 13A is to contact, is the upper end surface of the peripheral wall of the container body 11. When a comparison is made between the width of the ringed groove 121 and the width (thickness) of the upper end surface of the peripheral wall of the container body 11, the latter width (thickness) is smaller. Thus, in the case of regarding, as 1, the thickness of the upper end surface of the peripheral wall of the container body 11, the predetermined width of the contacting portion 13A is set preferably into the range of 1 to 20.

The retention of the sealed state by making the contacting portion 13A of the sealing moiety 13 into a planar form as described above can be unprecedentedly attained by using an elastomer composition that will be detailed later, which has an improved performance concerned with compressive permanent strain (CS) (a lowered CS value). In other words, in the case of using a conventional material poor in compressive permanent strain (CS) (high in CS value), a depression unrecoverable when the material is heated is easily generated in the contacting portion made into the planar form, so that the food container is less likely to keep the sealed state. Thus, the contacting portion is usually configured to be made into a concave form so that the upper end of the peripheral wall of the container body is held inside the concave form.

In the meantime, in the present invention, the elastomer composition used in the sealing moiety 13 is high in compressive permanent strain resistance. Thus, also when heated, the contacting portion 13A made into the planar form hardly turns into a depression form. Accordingly, the sealing moiety 13 can be improved in performance concerned with the retention of the sealed state by making the contacting portion 13A into the form of a plane with a predetermined width and widen an area of the portion 13A which can contact the upper end of the peripheral wall of the container body 11.

In the case of regarding, as 1, the thickness of the portion of the lid 12 where the sealing moiety 13 is located, that is, the thickness of the peripheral portion 12B, the thickness of the sealing moiety 13 is set preferably into the range of 1 to 4. That is to say, by setting the thickness of the sealing moiety 13 into a predetermined thickness, the sealed state of the periphery of the opening 111 can be kept while the food container can be satisfactorily restrained from being strained when heated by a microwave oven or the like. If the thickness of the sealing moiety 13 relative to the thickness of the peripheral portion 12B, which is 1, is less than 1, the sealing moiety 13 does not adhere closely to the container body 11 (or the lid 12) sufficiently, so that the sealed state may become insufficient. If the thickness of the sealing moiety 13 relative to the thickness of the peripheral portion 12B, which is 1, is more than 4, the sealing moiety 13 is more easily strained, correspondingly to the thickness increase. Thus, the restraint of the deformation may unfavorably become insufficient.

[Polypropylene]

About the lid 12 formed to be integrated with the sealing moiety 13, as a raw material thereof, a polypropylene is used.

The polypropylene is not limited to a homopolymer made from propylene. Thus, the polypropylene may be a copolymer made from propylene and a different α-olefin from the viewpoint of an improvement of the lid in transparency and impact resistance. The copolymer made from propylene and the different α-olefin may be, for example, an ethylene-propylene copolymer, which is high in transparency (provided that the ethylene content is preferably 20% or less by mass from the viewpoint of the heat resistance of the lid). The copolymer may be any one of a random copolymer, a block copolymer, and a graft copolymer.

The polypropylene is preferably a polypropylene having a melting point of 155° C. or higher from the viewpoint of the matter that the lid can satisfy an indicated heat resisting temperature prescribed in JIS S 2029 "Plastic Tableware", the temperature being for tableware usable in microwave ovens, and being 140° C. or higher.

The polypropylene is more preferably a homopolymer or block copolymer having a melting point of 155° C. or higher from the viewpoint of the heat resistance of the lid.

[Elastomer Composition]

About the sealing moiety 13, as a raw material thereof, an elastomer composition is used, which has elasticity.

The elastomer composition includes a hydrogenated styrene based block copolymer A having a weight-average molecular weight of 100,000 to 500,000, a softener B for rubber that has a weight-average molecular weight of 500 or more, and an olefin based resin C.

<Hydrogenated Styrene Based Block Copolymer A>

The hydrogenated styrene based block copolymer A is preferably a hydrogenated product of a block copolymer A' which includes a polymer block (a) including a styrene based monomer and a polymer block (b) including a conjugated diene compound from the viewpoint of the softness and the shapability of the elastic composition.

Examples of the styrene based monomer included in the polymer block (a) include styrene, o-methylstyrene, p-methylstyrene, p-tert-butylstyrene, 1,3-dimethylstyrene, α-methylstyrene, vinylnaphthalene, and vinyl anthracene.

Examples of the conjugated diene compound included in the polymer block (b) include butadiene, isoprene, and 1,3-pentadiene.

The hydrogenated styrene based block copolymer A is preferably a triblock copolymer. Specific examples thereof include SEBS, SEPS, SEEPS, styrene-ethylene-ethylene/propylene block copolymer, styrene-isobutylene-styrene block copolymer, and (α-methylstyrene)-ethylene/butylene-(α-methylstyrene) block copolymer.

By using, as the hydrogenated styrene based block copolymer A, a copolymer having a high weight-average molecular weight (Mw), the resultant elastomer composition tends to be amended in compressive permanent strain (CS) at 100° C. over 24 hours to be improved in compressive permanent strain resistance.

This wording "be amended in CS" denotes that the CS value becomes small. When the CS value becomes small, the sealing moiety 13 is easily returned to the original shape thereof even when compression force is repeatedly applied to the sealing moiety 13 to deform this portion. Thus, the sealing moiety 13 has a high effect of holding the sealed state of the food container.

Specifically, from the viewpoint of amending the CS, about the hydrogenated styrene based block copolymer A to be used, the Mw is preferably from 100,000 to 700,000, more preferably from 150,000 to 500,000, even more preferably from 200,000 to 450,000.

As the content by percentage of the polymer block (a) including the styrene based monomer in the hydrogenated styrene based block copolymer A becomes lower, power for holding the softener B for rubber in the resultant elastomer composition tends to become higher.

Specifically, from the viewpoint of heightening the power for holding the softener B for rubber, the content by percentage of the polymer block (a) including the styrene based monomer in the hydrogenated styrene based block copolymer A is preferably from 10 to 40% by mass, more preferably from 15 to 35% by mass.

The content by percentage of the polymer block (a) including the styrene based monomer can be calculated out from the charged amount of the monomer, and is also decidable by NMR measurement of the copolymer.

<Softener B for Rubber>

Examples of the softener B for rubber include paraffin oil, naphthene oil, and aromatic oil. Out of these examples, paraffin oil is preferred since the oil is good in affinity with the hydrogenated styrene based block copolymer A so that, for example, the oil is not easily shifted from the elastomer composition to other resins, for example, the polypropylene.

As the softener B for rubber, a softener having a weight-average molecular weight (Mw) of 500 or more is used to restrain the oil from being shifted to other resins, and improve the resultant elastomer composition in compressive permanent strain resistance. The weight-average molecular weight (Mw) of the softener B for rubber is preferably 700 or more, more preferably 900 or more. Moreover, the weight-average molecular weight is preferably 1500 or less from the viewpoint of the handling-easiness of the softener that is based on the viscosity.

A low-molecular-weight component contained in the softener B for rubber may unfavorably produce a bad effect onto the compressive permanent strain resistance of the resultant elastomer composition, and further the component may be shifted to other resins to promote the deformation of the resins according to thermal shrinkage thereof and some other phenomenon. In order to decrease such a low-molecular-weight component, the softener B for rubber is preferably a softener having a molecular weight distribution index (Mz) (weight-average molecular weight (Mw)/number-average molecular weight (Mn)) of 4.0 or less. The molecular weight distribution index (Mz=(Mw/Mn)) is more preferably 3.0 or less, even more preferably 2.5 or less. The molecular weight distribution index (Mz) (weight-average molecular weight (Mw)/number-average molecular weight (Mn)) is preferably 1.0 or more, more preferably 1.05 or more, even more preferably 1.2 or more since a softener having the index value is easily available.

The weight-average molecular weight (Mw) and the number-average molecular weight (Mn) of the softener B for rubber are measurable, using a gel permeation chromatographic method using a commercially-available polystyrene molecular weight standard.

If the content of the softener B for rubber in the elastomer composition is excessively small, the elastomer composition may be unfavorably lowered in softness to affect the water leak resistance of the container. From this viewpoint, the content is preferably 50 parts or more by mass, more preferably 100 parts or more by mass, even more preferably 150 parts or more by mass for 100 parts by mass of the hydrogenated styrene based block copolymer A. If the content is excessively large, the softener B for rubber may bleed easily to promote the deformation of the elastomer composition when the other resin integrated with the elastomer composition is heated. From this viewpoint, the content is preferably 300 parts or less by mass, more preferably 250 parts or less by mass, even more preferably 200 parts or less by mass.

<Olefin Based Resin C>

Examples of the olefin based resin C include polyethylene, polypropylene, ethylene-propylene copolymer, and other α-olefin polymers. The olefin based resin C is preferably polypropylene resin, out of these examples, from the viewpoint of the heating resistance and the compatibility thereof.

The olefin based resin C is not limited to a homopolymer made from an olefin. Thus, the olefin based resin C may be a copolymer made from the olefin and a different α-olefin to improve the container in transparency and impact resistance. The copolymer made from the olefin and the different α-olefin is, for example, an ethylene-propylene copolymer high in transparency (provided that the ethylene content is preferably 20% or less by mass from the viewpoint of the heat resistance of the container).

In other words, in the olefin based resin C, the copolymer thereof may be any one of homopolymers, random copolymers, block copolymers, and graft copolymers. Preferred is, out of these examples, one or more polymers selected from homopolymers and block copolymers. The olefin based resin C is more preferably a polymer having a melting point of 155° C. or higher since the resultant elastomer composition is improved in compressive permanent strain resistance.

The content of the olefin based resin C in the elastomer composition is preferably 2 parts or more by mass, more preferably 5 parts or more by mass, even more preferably 10 parts or more by mass for 100 parts by mass of the hydrogenated styrene based block copolymer A since if the content is excessively small, the hardness A of the composition is lowered. Moreover, if the content is excessively large, the hardness A is heightened. From this viewpoint, the content is preferably 100 parts or less by mass, more preferably 90 parts or less by mass, even more preferably 80 parts or less by mass.

<Performances>

About the elastomer composition, the hardness A is set to 5 or more to restrain the sealing moiety 13 from being sticky. The hardness A is preferably 10 or more, more preferably 30 or more. In order to keep the softness and the sealing performance of the sealing moiety 13, the hardness A is 70 or less, preferably 60 or less, more preferably 50 or less.

About the elastomer composition, the compressive permanent strain (CS) at 100° C. over 24 hours is set to 60% or less, preferably to 50% or less to restrain the lid 12 formed to be integrated with the sealing moiety 13 (or the container body as the case may be) from being deformed when the lid 12 or the container body is heated.

Hereinafter, a description is made about a relationship between the CS value and the deformation by the heating. Room temperature already exceeds the glass transition temperature of the elastomer composition. Usually, therefore, when the elastomer composition is made into a composite formed body, the raw material (the polypropylene in the present invention) of an adherend (the lid in the present embodiment) of the composite formed body is smaller in linear expansion coefficient than the elastomer composition, but the raw material (the polypropylene in the invention) is larger in tensile strength or compressive strength than the elastomer composition. When a thermal hysteresis, in this case, is given to the composite formed body using, as the raw material thereof, the polypropylene and the elastomer composition, the sealing moiety including the elastomer composition is turned into a compressed state at high temperatures. Consequently, the sealing moiety holds compressive strain as far as the compressive permanent strain of the elastomer composition is not 0. Thus, when the temperature of the sealing moiety and the lid (or the container body) is returned to room temperature, the compressive strain of the elastomer composition is released so that tensile strength is applied to the polypropylene. The tensile strength would be a motive power for a deformation phenomenon of the composite formed body according to the thermal hysteresis. From this viewpoint, as the elastomer composition is smaller in compressive permanent strain, the composition is favorably less easily deformed.

[Other Components]

An antioxidant may be incorporated into the above-mentioned polypropylene or elastomer composition from the viewpoint of a thermal deterioration thereof when the resin or composition is shaped, and a long-term use thereof. A thermal stabilizer may be incorporated thereinto from the viewpoint of a restraint of a change in properties of the resin under heating conditions.

The antioxidant may be selected at will from known antioxidants such as sulfur-containing, hindered phenolic, and phosphorus-containing antioxidants, so as to be used. One of these antioxidants may be singly used, or two or more thereof may be used in combination.

Examples of the thermal stabilizer include phosphorus-containing compounds, hydrazide compounds, organic sulfur-containing antioxidants, phenolic antioxidants, and amine antioxidants. A compound may be used which is combined with an interesterification catalyst to form, for example, a chelate to decrease the activity of the catalyst. In the present invention, phosphorus-containing compounds, and hydrazide compounds are preferred. Two or more of these compounds may be used in combination.

As far as the advantageous effects of the present invention are not damaged, a plastic additive that may be of various types, and/or the following as a different additive may be incorporated besides the antioxidant and the thermal stabilizer into the polypropylene or the elastomer composition: a pigment, a different thermoplastic resin, and a thermoplastic elastomer. Examples of the different additive include a lubricant such as a heavy metal inactivating agent, and a fatty acid ester; a light stabilizer such as benzotriazole compounds, benzophenone compounds, benzoate compounds, and hindered phenolic compounds; a hydrolysis preventive such as carbodiimide compounds, and oxazoline compounds; a plasticizer such as phthalic acid ester compounds, polyester compounds, (meth)acrylic oligomers, and process oils; an inorganic foaming agent such as sodium bicarbonate, and ammonium bicarbonate; an organic foaming agent such as nitro compounds, azo compounds, and sulfonylhydrazide compounds; a filler such as carbon black, calcium carbonate, talc, and glass fiber; a flame retardant such as tetrabromophenol, ammonium polyphosphate, melamine cyanurate, magnesium hydroxide, and aluminum hydroxide; a compatibilizer such as silane coupling agents, titanate coupling agents, aluminum coupling agents, and acid-modified polyolefin resins; and pigments and dyes.

[Manufacturing Method]

The lid 12 and the sealing moiety 13 are formed into an integrated form by two color formation. The two color formation makes use of a two color forming mold having a primary forming cavity for forming the lid 12, and a secondary forming cavity for forming the sealing moiety 13.

In the two color formation, a polypropylene is initially injected into the primary forming cavity, and this system is cooled to cure the polypropylene to form the lid 12 inside the primary forming cavity. Next, an elastomer composition is injected into the secondary forming cavity, and this system is cooled to cure the elastomer composition to form the sealing moiety 13 to be integrated with a predetermined site of the lid 12.

The two color forming mold is classified into a core-back type mold, in which a core is partially moved to shape the primary forming cavity and the secondary forming cavity, and a rotary type mold, in which the position of a mobile mold part is shifted to that of a fixed mold part through, for example, a turntable. Any one of the two type molds may be used.

The two color formation has an advantage of being shorter or smaller in forming cycle period and labor than insert formation, in which a lid that is a primary formed body is once taken out from a mold, and then the formed body is again set to another mold.

In the case of two or more material species not good in physical property balance in a high-temperature environment used for ordinary food containers, the resultant primary formed body is partially strained. Thus, the two color formation cannot be a favorable manufacturing method. However, the polypropylene and the elastomer composition in the present invention are good in physical property balance in a high-temperature environment. Thus, the two color formation is a favorable manufacturing method.

Modified Examples

The food container of the present invention is not limited to any container having the above-mentioned structure. Thus, the structure thereof may be varied, for example, as described below.

The formation of the sealing moiety is not limited to the formation of the sealing moiety to be integrated with the lid. Thus, the sealing moiety may be formed to be integrated with the container body. In this case, the raw material of the container body formed to be integrated with the sealing moiety may be a polypropylene. When the sealing moiety is formed to be integrated with the container body, the sealing moiety is set to the upper end surface of a peripheral wall of the container body. When the sealing moiety is formed to be integrated with the container body, a contacting site thereof is a peripheral portion of the lid. In this case, a predetermined width of the contacting portion of the sealing moiety is preferably set as follows: in the case of making a comparison between the width (thickness) of the upper end surface of the peripheral wall of the container body, and the width of the peripheral portion of the lid, and then regarding smaller one of the two widths as 1, the predetermined width is set into the range of 1 to 20. More preferably, the predetermined width is set to a width substantially equal to the width (thickness) of the upper end surface of the peripheral wall of the container body.

The raw material of any matter formed to be integrated with the sealing moiety is limited to a polypropylene. However, about a matter not formed to be integrated with the sealing moiety, such as the container body 11 in the above-mentioned embodiment or the lid in the modified example, the raw material thereof is not particularly limited. Thus, any material is usable as far as the material is a material used ordinarily for food containers, such as a metallic, glassy or plastic material. Out of such materials, preferred is a glassy or plastic material from the viewpoint of sanitation, and the heat resistance thereof. Out of species of the plastic material, polypropylene, polyester and polycarbonate are preferred. The container body and the lid are substantially always used together with each other. Thus, in order to make the handling thereof by users easy, polypropylene is more preferred.

The method for manufacturing the food container may be a forming method known in the prior art other than the two color formation.

EXAMPLES

[Used Material List]
1. Elastomer Compositions (Sealing Moiety Materials)
<Hydrogenated Styrene Based Block Copolymers A (Each Expressed as "A" in any Table)>

Examples (1) Hydrogenated SEBS copolymer, G1651H [trade name], manufactured by Kraton Corp.; Mw=320,000, and styrene based polymer block content by percentage=33%.

Comparative Examples (1') Hydrogenated SEBS copolymer, G1652 [trade name], manufactured by Kraton Corp.; Mw=78000, and styrene based polymer block (a) content by percentage=30%.

<Softeners B for Rubber (Each Expressed as "B" in any One of the Tables)>

Examples (1) Paraffin oil, PW-380 [trade name], manufactured by Idemitsu Kosan Co., Ltd.; Mw=1100, and Mz (Mw/Mn)=1.1.
(2) Paraffin oil, HYDROBRITE 1000 [trade name], manufactured by Sonneborn, LLC; Mw=900, and Mz (Mw/Mn)=2.2.

Comparative Examples (1') Paraffin oil, KAYDOL [trade name], manufactured by Sonneborn, LLC; Mw=310, and Mz (Mw/Mn)=6.9.
<Olefin Based Resin C (Expressed as "C" in any One of the Tables)>

Examples and Comparative Examples (1) Polypropylene resin, PW 600A [trade name], manufactured by SunAllomer Ltd.
2. Polypropylenes (Lid Material)
(1) Homo PP (propylene homopolymer), PM 802 [trade name], manufactured by SunAllomer Ltd.; melting point: 162° C.
(2) Random PP (ethylene/propylene random copolymer), PB 222A [trade name], manufactured by SunAllomer Ltd.; melting point: 146° C.
(3) Block PP (ethylene/propylene block copolymer), PM 870A [trade name], manufactured by SunAllomer Ltd.; melting point: 161° C.
<Polypropylene Resin Melting Points>

About 10 mg of a sample of each of the polypropylenes was put into an aluminum pan, and an aluminum lid was fitted thereto under pressure. The aluminum pan was set to an instrument measuring section of a differential scanning calorimeter (DSC 8000, manufactured by PerkinElmer, Inc.), and then the sample was measured in air at a temperature-raising rate of 20° C./minute. The resultant melting peak was analyzed in accordance with a method prescribed in JIS K 7121 to determine the melting point.
[Blend Compositions]

Respective blend compositions of Examples 1 to 3 are shown in Table 1; ones of Examples 4 to 6, in Table 2; and ones of Comparative Examples 1 and 2, in Table 3.

In each of the tables, in fields 2 (polypropylenes), a PP used in each of the working examples and the comparative examples, out of the homo PP, the random PP and the block PP, is shown by a circular mark.
[Performance Evaluations]

The working examples and the comparative examples were each tested by a method in each item described below to evaluate performances of the example. The results are shown in Tables 1 to 3.
<Hardness A>

By injection molding using each of the elastomer compositions, each plate of 2 mm thickness was yielded. After the injection molding, the plates were allowed to stand still in a constant-humidity and a constant-temperature room (temperature: 23° C. and relative humidity: 50%) for 24 hours or longer to stabilize the state of the plates. Thereafter, three of the plates were put onto each other to prepare a test piece. About this test piece, the hardness A thereof was measured in accordance with JIS K 7215 "Method for Testing Durometer Hardness of Plastic Material".

<Compressive Permanent Strain (CS)>

By injection molding using each of the elastomer compositions, a plate of 2 mm thickness was yielded. Next, the plate was cut into the form of discs. Furthermore, six of the cut discs were put onto each other to prepare a test piece. About this test piece, the compressive permanent strain (CS) thereof was measured in accordance with a compressive permanent strain test prescribed in JIS K 6262.

Specifically, in the compressive permanent strain test, at a standard temperature (of 23.2±2° C.), it was verified that the diameter of the test piece was 29.0±0.5 mm, and the thickness thereof was 12.5±0.5 mm). The results were regarded as standard values, and the test piece was sandwiched between compressing plates to interpose a spacer (thickness: 9.3 to 9.4 mm) between the test piece and each of the compressing plates. In the state that the test piece was compressed by 25% by volume, the test piece was kept at 100° C. for 24 hours. Thereafter, at the standard temperature, the compressing plates were removed off, and the test piece was allowed to stand still for 30 minutes. Thereafter, the thickness of the center of the test piece was measured. The measurement result was substituted into a compressive permanent strain calculating expression as described below to calculate out the compressive permanent strain (CS).

$$CS\ (\%) = [(t0-t2)/(t0-t1)] \times 100$$

In the expression, t0 represents the original thickness (mm) of the test piece; t1, the thickness (mm) of the spacers; and t2, the thickness (mm) of the test piece after 30 minutes from the time of taking off the test piece from the compressing machine.

After the compression was cancelled, the CS value when the elastomer was completely returned into the dimension shape before the compression was 0%. In a case where the elastomer kept a compressed shape not to be returned into the original dimension shape also when the compression was cancelled, the CS value was 100%. It therefore means that as the CS value is smaller in the range of 0 to 100%, the elastomer is better in returning power.

<Heat Resistance Test>

The lid 12 illustrated in FIG. 4 was formed to be integrated with the sealing moiety 13 made of the elastomer composition yielded to have the blend composition in each of the working examples and the comparative examples. Next, the lid 12 was allowed to stand still for 1 hour in a gear oven (forcibly circulating thermal aging testing machine, manufactured by Toyo Seiki Kogyo Co., Ltd.; model number: STD 45-P) having an atmosphere having a temperature of 140±1° C. The lid 12 was then taken off therefrom, and then naturally cooled at room temperature for 1 hour. The lid was put on a horizontal stand to earth the packing side. The following was then measured in the unit of "mm": the maximum raise-up height of a long-diameter side of the lid 12 from the earthed surface in a range within a 10-cm width of the side. In this way, the thermal deformation quantity of the lid 12 was measured.

<Water Leak Test After Heat Resistance Test>

(JIS Visual Observation)

In accordance with a water leak test of a sealing container that is prescribed in JIS S 2029, 264 mL of water was put into the container body 11 (inner volume: 880 mL) illustrated in FIG. 2, and the lid 12 after the heat resistance test was fitted to the container body 11. The resultant, and the same lid-fitted containers were prepared in a total number of 10. At a room temperature of 25° C., a long-diameter side of each of the lid-fitted containers was earthed and then the container was kept vertically for 30 minutes. Furthermore, the container was rotated by 180°, and then kept for 30 minutes. When water leak (water droplet) was found out even in one, out of the ten containers, the example was judged to be bad (cross mark), or when no water droplet was found out in each of the ten, the example was judged to be good (circular mark).

(Detection Through Filtering Paper Piece)

About any sample judged to be good through the JIS visual observation, out of the entire samples, in order to evaluate the sample more strictly about water leak, a piece, 10 mm×40 mm in size, cut out from a filtrating paper piece (manufactured by Advantec Co., Ltd.; article name: No. 5C) was used as a detecting paper piece. This detecting paper piece was inserted through the joined portion between the sealing moiety 13 and the container body 11 into the contacting surface of the sealing moiety of a corner of the lid, and then the paper piece was brought into contact with the surface over 10 seconds. Before and the after the contact, the detecting paper piece was weighed in the unit of 0.1 mg. When the weight of the detecting paper piece was increased in a weight of 1 mg or more, the piece was judged to be a water-detected piece. The number of water-detected pieces, out of the 10 paper pieces, was counted.

TABLE 1

| | | | | | Blend proportions | | | | | |
|---|---|---|---|---|---|---|---|---|---|---|
| | | | | | Example 1 | | Example 2 | | Example 3 | |
| List No. | | | Raw material | Characteristics | Parts by mass | Percent by mass | Parts by mass | Percent by mass | Parts by mass | Percent by mass |
| 1 | A | (1) | SEBS | Mw = 320,000 | 100.0 | 32.1 | 100.0 | 32.1 | 100.0 | 32.1 |
| | | (1') | SEBS | 19: Mw = 78000 | | | | | | |
| | B | (1) | Paraffin oil | Mw = 1100 Mz = 1.1 | 185.2 | 59.5 | | | | |
| | | (2) | Paraffin oil | Mw = 900 Mz = 2.2 | | | 185.2 | 59.5 | 185.2 | 59.5 |
| | | (1') | Paraffin oil | Mw = 310 Mz = 6.9 | | | | | | |
| | C | (1) | PP | | 25.9 | 8.3 | 25.9 | 8.3 | 25.9 | 8.3 |
| | | | | Total | 311.1 | 100.0 | 311.1 | 100.0 | 311.1 | 100.0 |
| 2 | | (1) | Homo PP | Melting point: 162° C. | ○ | | ○ | | | |
| | | (2) | Random PP | Melting point: 146° C. | | | | | | |
| | | (3) | Block PP | Melting point: 161° C. | | | | | ○ | |

TABLE 1-continued

| Evaluating items | Conditions | Unit | Evaluation results | | |
|---|---|---|---|---|---|
| Hardness A | Standing still for 24 hours | Point | 36 | 36 | 36 |
| Compressive permanent strain (CS) | 100° C. × 24 hr | % | 25 | 25 | 25 |
| Heat resistance test | Evaluation according to thermal deformation quantity | mm | 2 | 3 | 3 |
| Water leak test | JIS visual observation (of water droplet) | | ○ | ○ | ○ |
| | Detection through filtrating paper piece | | 0 | 0 | 0 |

TABLE 2

| | | | | | Blend proportions | | | | |
|---|---|---|---|---|---|---|---|---|---|
| | | | | | Example 4 | | Example 5 | | Example 6 | |
| List No. | | Raw material | Characteristics | Parts by mass | Percent by mass | Parts by mass | Percent by mass | Parts by mass | Percent by mass |
| 1 | A (1) | SEBS | Mw = 320,000 | 100.0 | 32.1 | 100.0 | 28.3 | 100.0 | 38.0 |
|   | (1') | SEBS | 19: Mw = 78000 | | | | | | |
|   | B (1) | Paraffin oil | Mw = 1100 Mz = 1.1 | 185.2 | 59.5 | 222.2 | 62.9 | 142.9 | 54.4 |
|   | (2) | Paraffin oil | Mw = 900 Mz = 2.2 | | | | | | |
|   | (1') | Paraffin oil | Mw = 310 Mz = 6.9 | | | | | | |
|   | C (1) | PP | | 25.9 | 8.3 | 31.1 | 8.8 | 20.0 | 7.6 |
|   |   |   | Total | 311.1 | 100.0 | 353.3 | 100.0 | 262.9 | 100.0 |
| 2 | (1) | Homo PP | Melting point: 162° C. | | | ○ | | ○ | |
|   | (2) | Random PP | Melting point: 146° C. | ○ | | | | | |
|   | (3) | Block PP | Melting point: 161° C. | | | | | | |

| Evaluating items | Conditions | Unit | Evaluation results | | |
|---|---|---|---|---|---|
| Hardness A | Standing still for 24 hours | Point | 36 | 32 | 44 |
| Compressive permanent strain (CS) | 100° C. × 24 hr | % | 25 | 26 | 34 |
| Heat resistance test | Thermal deformation quantity | mm | 5 | 3 | 4 |
| Water leak test | JIS visual observation (of water droplet) | | ○ | ○ | ○ |
| | Detection through filtrating paper piece | | 1 | 1 | 2 |

TABLE 3

| | | | | Blend proportions | | | |
|---|---|---|---|---|---|---|---|
| | | | | Comparative Example 1 | | Comparative Example 2 | |
| List No. | | Raw material | Characteristics | Parts by mass | Percent by mass | Parts by mass | Percent by mass |
| 1 | A (1) | SEBS | Mw = 320,000 | | | 100.0 | 32.1 |
|   | (1') | SEBS | 19: Mw = 78000 | 100.0 | 32.1 | | |

TABLE 3-continued

| | | | | | | | | |
|---|---|---|---|---|---|---|---|---|
| B | (1) | Paraffin oil | Mw = 1100<br>Mz = 1.1 | 185.2 | 59.5 | | | |
| | (2) | Paraffin oil | Mw = 900<br>Mz = 2.2 | | | | | |
| | (1') | Paraffin oil | Mw = 310<br>Mz = 6.9 | | | 185.2 | 59.5 | |
| C | (1) | PP | | 25.9 | 8.3 | 25.9 | 8.3 | |
| | | | Total | 311.1 | 100.0 | 311.1 | 100.0 | |
| 2 | (1) | Homo PP | Melting point: 162° C. | ○ | | ○ | | |
| | (2) | Random PP | Melting point: 146° C. | | | | | |
| | (3) | Block PP | Melting point: 161° C. | | | | | |

| Evaluating items | Conditions | Unit | Evaluation results | |
|---|---|---|---|---|
| Hardness A | Standing still for 24 hours | Point | 31 | 36 |
| Compressive permanent strain (CS) | 100° C. × 24 hr | % | 100 | 65 |
| Heat resistance test | Thermal deformation quantity | mm | 6 | 9 |
| Water leak test | JIS visual observation (of water droplet) | | x | x |
| | Detection through filtrating paper piece | | — | — |

CONCLUSION

Examples 1 to 6 gained results good in all of the hardness A, the CS, and the heat resistance test.

Comparative Example 1 made use of the hydrogenated styrene based block copolymer having a weight-average molecular weight (Mw=78,000) out of the range of 100,000 to 500,000 as the hydrogenated styrene based block copolymer A of the elastomer composition, so as to be a soft food container having a hardness A of 31, which was smaller than the hardness A of Examples 1, which was 36. Such a softness usually acts favorably for water leak resistance. However, in the light of the matter that water leak was generated and the CS was a very large value of 100%, it is presumed that the comparative example was bad in compressive permanent strain resistance so that a gap was generated on the contacting surface of the sealing moiety to generate the water leak.

Comparative Example 2 made use of the softener having a weight-average molecular weight less than 500 (Mw=310) as the softener B for rubber in the elastomer composition, so as to have a hardness A of 36, which was equal to the hardness A of Examples 1. However, the CS value was as large as 65%, and further the thermal deformation quantity was 9 mm, which was far larger than a value of 2 mm in Example 1, so that water leak was also generated. In the light of these results, it is presumed that the deformation of the lid was promoted by deforming-force based on the matter that the elastomer composition for the lid was bad in compressive permanent strain resistance, and further by the shift of low-molecular weight components in the softener B for rubber from the sealing moiety to the lid.

INDUSTRIAL APPLICABILITY

About the food container of the present invention, its sealing moiety is formed to be integrated with its lid or container body. Therefore, the container is less likely to be deformed when heated in a microwave oven and others. Thus, the container can keep a sealed state to be industrially usable.

REFERENCE SIGNS LIST

10: Food container
11: Container body
12: Lid
13: Sealing moiety
111: Opening
112: Flange
113: Projection
12A: Planar portion
12B: Peripheral portion
121: Ringed groove
122: Fixing portions
123: Hinges
124: Hooks

The invention claimed is:

1. A food container, comprising a container body having an opening, and a lid for closing the opening in the container body; the lid having a sealing moiety for making the periphery of the opening into a sealed state under a situation that the opening in the container body is closed by the lid;
the sealing moiety comprising an elastomer which comprises a hydrogenated styrene based block copolymer A that has a weight-average molecular weight of 100,000 to 500,000, a softener B for rubber that has a weight-average molecular weight of 500 or more, and an olefin based resin C, and which has a hardness A of 32 to 36 both inclusive, and a compressive permanent strain (CS) of between 25% to 28% at 100° C. over 24 hours; the sealing moiety being formed to be integrated with the lid or the container body; and the lid comprising a polypropylene,
wherein the polypropylene is a polypropylene having a melting point of 155° C. or higher, wherein in the elastomer composition, the blend amount of the softener B for rubber is from 185.2 to 222.2 parts by mass and that of the olefin based resin C is from 25.9 to 31.1 parts by mass for 100 parts by mass of the hydrogenated styrene based block copolymer A;

the hydrogenated styrene based block copolymer A is a hydrogenated product of a block copolymer A' which comprises a polymer block (a) comprising a styrene based monomer and a polymer block (b) comprising a conjugated diene compound, the content by percentage of the polymer block (a) comprising the styrene based monomer being 33% by mass; and the softener B for rubber is a softener having a molecular weight distribution index (weight-average molecular weight (Mw)/number-average molecular weight (Mn)) of 4.0 or less;

the food container has a flange on the outside surface of a peripheral wall of the container body, wherein a projection is formed at the outer circumferential edge so as to be downward projected;

the lid has a fixing portion, wherein hooks are formed to have an L-shaped cross section in order to fit the projection;

the sealing moiety is formed so as to be arranged between the lid and the upper end surface of the peripheral wall of the container body when the opening of the container body is closed by the lid;

the sealing moiety is provided with a contacting portion which is to contact a predetermined site of the upper end surface of the peripheral wall of the container body, and the contacting portion is formed with a predetermined width to be made, as a whole, into a planar form; and the upper end surface of the peripheral wall of the container body that contacts the contacting portion includes a contacting surface portion on a planar shape that contacts the contacting portion.

2. The food container according to claim 1, when making a comparison between the width of a site of the lid or container body that is a site formed to be integrated with the sealing moiety, and the width of the predetermined site, which the contacting portion is to contact, and then regarding smaller one of the two widths as 1, the predetermined width of the contacting portion is set into the range of 1 to 20.

3. The food container according to claim 1, wherein when the thickness of a site of the lid where the sealing moiety is formed is regarded as 1, the thickness of the sealing moiety is set into the range of 1 to 4.

4. A method for manufacturing the food container according to claim 1, by performing a two color formation comprising:

using a two color forming mold to inject a polypropylene into a cavity for forming the lid or the container body to form the lid or the container body into a predetermined shape; and subsequently injecting an elastomer composition into a cavity for the sealing moiety to form the sealing moiety to be integrated with the lid or the container body at a predetermined site of the lid or the container body which is a site becoming the periphery of the opening in the lid or the container body.

* * * * *